United States Patent [19]
Burt et al.

[11] Patent Number: 5,629,988
[45] Date of Patent: May 13, 1997

[54] SYSTEM AND METHOD FOR ELECTRONIC IMAGE STABILIZATION

[75] Inventors: Peter J. Burt; Keith J. Hanna, both of Princeton, N.J.

[73] Assignee: David Sarnoff Research Center, Inc., Princeton, N.J.

[21] Appl. No.: 328,783

[22] Filed: Oct. 28, 1994

Related U.S. Application Data

[63] Continuation of Ser. No. 71,814, Jun. 4, 1993, abandoned.
[51] Int. Cl.⁶ ........................................................ G06K 9/36
[52] U.S. Cl. ........................................... 382/276; 382/107
[58] Field of Search ................................ 382/276, 107, 382/215, 268, 302; 364/516; 348/135, 154

[56] References Cited

U.S. PATENT DOCUMENTS

| | | | |
|---|---|---|---|
| 4,692,806 | 9/1987 | Anderson et al. | 358/209 |
| 4,703,514 | 10/1987 | Van Der Wal | 382/41 |
| 4,835,532 | 5/1989 | Fant | 345/136 |
| 5,063,603 | 11/1991 | Burt | 382/37 |
| 5,067,014 | 11/1991 | Bergen et al. | 358/105 |
| 5,251,271 | 10/1993 | Fling | 382/54 |
| 5,259,040 | 11/1993 | Hanna | 382/41 |

FOREIGN PATENT DOCUMENTS

| | | |
|---|---|---|
| WO9000334 | 1/1990 | WIPO. |
| WO9307585 | 4/1993 | WIPO. |

OTHER PUBLICATIONS

Paik et al., IEEE Transactions On Consumer Electronics, v. 38, No. 3, Aug. 1992, pp. 607–615.

S. F. Wu et al, Signal processing: Image Communication 2, vol. 1, No. 2, May 1990, pp. 69–80,.

G. S. van der Wal, P. J. Burt "A VLSI Pyramid Chip For Multiresolution Image Analysis" International Journal For Computer Vison Nov. 91 Special Issue.

P. J. Burt, et al "Object Tracking With A Moving Camera An Application Of Dynamic Motion Analysis Proceedings of the Workshop on Visual Motion", Irvine CA Mar. 20–22, 1989 pp. 1–12.

G. S. van der Wal "The Sarnoff Pyramid Chip" Proceedings of Computer Architecture for Machine Perception (CAMP-91) Paris, Dec. 16, 1991.

P. J. Burt, "The Pyramid As A Structure For Efficient Computation" Multiresolution Image Processing and Analaysis-Springer-Verlag 1984.

*Primary Examiner*—Yon J. Couso
*Attorney, Agent, or Firm*—William J. Burke

[57] ABSTRACT

The invention is a system and method for electronic stabilization of a image produced by an electronic imaging device. The input may be any sequence of image frames from an image source, such as a video camera, an IR or X-ray imager, radar, or from a storage medium such as computer disk memory, video tape or a computer graphics generator. The invention can also be used with images from multiple sources when these must be stabilized with respect to one another. The invention uses a feedback loop and second image warp stage to achieve precise image alignment as part of the displacement estimation process. The output of the stabilization system is a modified image sequence in which unwanted components of image motion have been reduced or removed, or in which new motion of a desired form has been introduced. The output may also include information derived from the input sequence, such as estimated frame-to-frame displacement vectors or motion flow fields, and derived image sequences with reduced noise or highlighted change.

15 Claims, 9 Drawing Sheets

SYSTEM AND METHOD FOR ELECTRONIC IMAGE STABILIZATION

This is a continuation of application Ser. No. 08/071,814 filed on Jun. 4, 1993 now abandoned.

The invention relates to a method and apparatus for electronic stabilization of image sequences using distal image processing to remove an unwanted component of frame to frame motion.

BACKGROUND OF THE INVENTION

The need for image stabilization arises in many applications including the movie industry which must remove unwanted jitter between successive frames of source video, television news cameramen who must stabilize video from hand held cameras in newscasts produced in the field, video from surveillance cameras molted on swaying or rotating platforms, or on moving vehicles, which must be stabilized prior to computer analysis, or prior to display to human observers, and video from moving vehicles which must be stabilized prior to image compression or presentation to a remote operator (teleoperation) or to computer vision systems for automatic driving.

Mechanically stabilized platforms of various types are used in surveillance to compensate for imager, not image, motion. In FIG. 1, an imager 10 is mounted on a mechanically stabilized platform 12. The output $I_{in}(t)$ on lead 14 of the imager 10 is displayed on a monitor 16. The platform 12 typically uses gyroscopes to sense platform rotation, and motors to compensate for that rotation. A user can guide the imager direction of gaze (pan and tilt) and zoom via an electronic control sisal 18 and motor drives in the platform 12.

Electronic stabilization with imager motion sensors can be used to compensate for imager motion but not image motion. In FIG. 2, an imager 10, mounted on a mechanically stabilized platform 12, has an output $I_{in}(t)$ on lead 14. Residual motion of the platform 12 is measured using sensors 20. Sensed displacements d(t) on lead 22 are converted to transformation parameters p(t) on lead 24 by a transform module 26. Parameters p(t) 24 are used by image warp deuce 28 to produce a stabilized output image $I_{out}(t)$ 30, in which imager motion has been compensated, for display on monitor 16.

In FIG. 3 a system for electronic stabilization with digital processing to sense image motion is shown. The system includes imager 10 having an output $I_{in}(t)$ 14 which is stored in an image frame store 32 to hold the image until appropriate warp parameters have been computed and transmitted to image warp device 28 for stabilization. (This frame store is not needed if the warp performed at one frame time is based on parameters computed at the previous frame time.) In order to reduce memory, a set of features may be extracted from the source video by module 34. A second image frame store 36 is provided to hold the features extracted from the previous image so that it can be compared with the present image. The features f(t) on lead 38 extracted at time t are compared with features f(t-1) on lead 40 extracted at time (t-1) in displacement estimator 42 that uses digital image processing to determine image-to-image motion to produce displacements d(t) on lead 44. One commercially available camera uses an array of 36 pixels as the features compared between frames. Sensed displacements d(t) on lead 44 are used by image warp device 28 to produce a stabilized output image $I_{out}(t)$ 30, in which image motion has been compensated, for display on monitor 16. Such systems known to the inventor can not compensate zoom, rotation, parallax and/or lens distortion.

In FIG. 4 an electronic target tracking system uses correlation to locate a target within an imager's field of view, then steers the imager to center the target, and, at least roughly, stabilize the target pattern. The system includes imager 10 having an output image $I_{in}(t)$ 14 which is compared in a correlation module 46 to match a reference pattern stored therein with the image 14. The reference pattern is selected from a prior frame in the video sequence module 48, stored in memory 50. The reference pattern may represent a stationary object in the scene or a moving object. The difference between the image $I_{in}(t)$ and the reference pattern provides displacement information to transform module 26 which converts this information to produce a signal to stabilize platform 12.

In FIG. 5 a system for electronic target tracking using change detection is shown. The difference between the current image $I_{in}(t)$ and a previous image $I_n(t-1)$ in frame store 60 is determined by subtractor 62 and regions of significant change are located. The location information x(t) provided by module 64, is used to redirect the imager 10 to maintain the image at a particular point or on a particular track in the displayed image. This approach may be preferred to a pattern based approach when targets are too small to be detected based on pattern match, but are moving so that detection can be based on this motion. Existing systems require that motion of the background scene be small so that target motion can be detected.

Burt et al. in the Proceedings Of The Workshop On Visual Motion, Irvine, Calif., Mar. 20–22, 1989, pages 1–12, have disclosed procedures for obtaining precise image alignment through iterative refinement. Such procedures have been used for such applications as terrain shape recovery and moving target detection. It would be desirable to have a method and system for electronically stabilizing images which can compensate zoom, rotation, parallax and/or lens distortion while having improved accuracy. It would also be desirable to extend the functionality of an image stabilization system to include derived image sequences with reduced noise or highlighted change by making use of information generated as a byproduct of the improved stabilization process.

SUMMARY OF THE INVENTION

The invention is an apparatus and method for electronic stabilization of an image. The input may be any sequence of image frames from an image source, such as a video camera, an IR or X-ray imager, radar, or from a storage medium such as computer disk memory, video tape or a computer graphics generator. The output of the system is a modified image sequence in which unwanted components of image motion have been reduced or removed, or in which new motion of a desired form has been introduced. The output may also include information derived from the input sequence, such as estimated frame-to-frame displacement vectors or motion flow fields, and derived image sequences with reduced noise or highlighted change.

The invention is a method for stabilizing an image relative to a reference comprising the steps of (a) warping the reference using an initial estimate of the displacement between the image and the reference; (b) comparing the warped reference with the image to obtain a residual displacement; (c) adding the residual displacement to the initial estimate to obtain a revised estimate of the displacement between the image and the reference; (d) warping the reference using the revised estimate of the displacement; (e) repeating steps (b), (c) and (d) K times, thereby forming a final estimate of the displacement d(t; K); (f) forming output transformation parameters p(t) from the final estimate of the displacement d(t; K); and (g) warping the image using output transformation parameters p(t) to form an output image.

The invention is also apparatus for stabilizing an image relative to a reference comprising means for warping the reference in response an estimate of the displacement between the reference and the image; means for comparing the warped reference with the image to obtain a residual displacement; means for adding the residual displacement to the initial estimate to obtain a revised estimate of the displacement between the image and the reference; means for warping the reference using the revised estimate of the displacement; means for repeating steps (b), (c) and (d) K times, thereby forming a final estimate of the displacement d(t; K); means for forming output transformation parameters p(t) from the final estimate of the displacement d(t; K); and means for warping the image Iin(t) using output transformation parameters p(t) to form an output image.

BRIEF DESCRIPTION OF THE DRAWING

Elements common to different Figures are given the same numerical identification in each of the Figures.

DETAILED DESCRIPTION

The invention is a system and method for electronically stabilizing an image produced by an electronic imaging device. The input may be any sequence of image frames $I_{in}(t)$ from an image source, such as a video camera, an IR or X-ray imager, radar, or from a storage medium such as computer disk memory, video tape or a computer graphics generator. The invention can also be used with images from multiple sources when these must be stabilized with respect to one another, with one image being stabilized and the other image providing the reference. The invention uses a feedback loop and second image warp stage to achieve precise image alignment as part of the displacement estimation process. The output of the stabilization system is a modified image sequence, $I_{out}(t)$, in which unwanted components of image motion have been reduced or removed, or in which new motion of a desired form has been introduced. The output may also include information derived from the input sequence, such as estimated frame-to-frame displacement vectors or motion flow fields, and derived image sequences with reduced noise or highlighted change.

Figure 6:
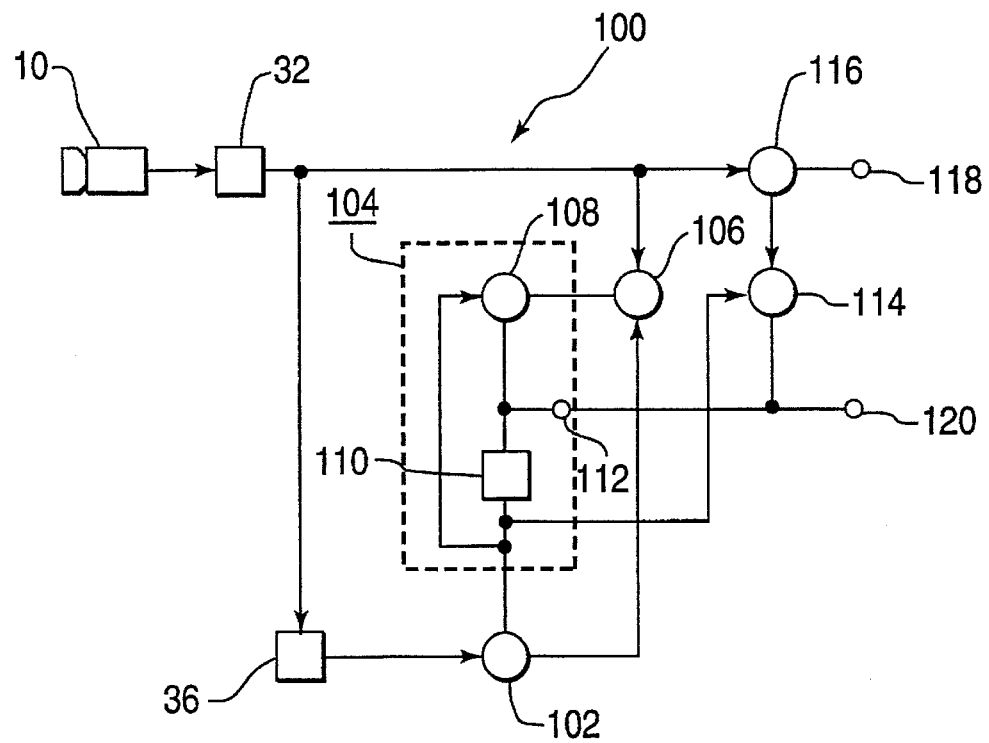
FIG. 6 is a schematic diagram of an electronic stabilization system of the invention.

In FIG. 6 an electronic stabilization system 100 of the invention comprises an imager 10 having an output $I_{in}(t)$, an image frame store 32 for storing the image $I_{in}(t)$, and a second frame store 36 for storing a previous image $I_{in}(t-1)$. The contents $I_{in}(t-1)$ in frame store 36 is warped in prior frame image warper 102 using an initial estimate d(t; 0) of the displacement provided by a feedback loop 104, shown in the dotted box, to provide a warped prior image $I_{in}(t-1; k-1)$. The warped prior image $I_{in}(t-1; k-1)$ is compared in means 106 for estimating displacement with the original image $I_{in}(t)$ to obtain an estimate of the residual displacement $\Delta(t; k)$ which provides an input to the feedback loop 104 from the displacement estimator 106. The residual displacement $\Delta(t; k)$ is then added to the previous estimate of the displacement in adder 108 and held in memory 110 to produce a refined estimate of the displacement d(t; k)=d(t; k 1)+$\Delta$(t; k). These steps are repeated K times until the residual displacement is less than a given value or, alternatively, a fixed number of times selected by an operator or other means, thereby forming a final estimate of the displacement. Terminal 112 is connected to a means 114 for converting the final estimate of the displacement d(t; k) to output transformation parameters p(t). This includes any image change which can be modelled, including zoom, most parallax, translation, rotation, dilation and lens distortion. The output of the means 114 is connected to the present image warper 116. Present image warper 116 warps the present image $I_{in}(t)$ to form $I_{out}(t)$ at terminal 118. The refined estimate of the displacement d(t; K) after K iterations in the feedback loop 104 is also available at output terminal 120. The estimates of the image-to-reference/image displacement can be based on displacement measures computed over only parts of the image domain, e.g., those containing targets patterns.

In the method of the invention, iteration k begins with a prior estimate d(t; k-1) of the displacement from $I_{in}(t-1)$ to $I_{in}(t)$. Image $I_{in}(t-1)$ is warped by d(t; k-1) to form the warped image $I_{warp}(t-1; k-1)$. The displacement estimation process is applied to the current $I_{in}(t)$ and the warped image $I_{warp}(t-1; k-1)$ to obtain an estimate of the residual displacement Dd(t; k). The residual displacement $\Delta$d(t; k) is then added to the prior estimate of displacement to obtained a refined estimate of displacement d(t; k)=d(t; k-1)+$\Delta$d(t; k). The image warp step is then repeated to form $I_{warp}(t-1; k)$ that is more precisely aligned with $I_{in}(t)$. These steps are repeated K times to obtain a final estimate d(t; K) of the displacement from frame $I_{in}(t-1)$ to frame $I_{in}(t)$. The prior estimate used in the first iteration of this process, d(t; 0), may be based on the final estimation obtained at the previous frame time, e.g., d(t; 0)=d(t-1; K). The cycle at time t is then completed by transferring a copy of $I_{in}(t)$ from frame store 32 to frame store 36.

In this embodiment, the prior, or reference, frame $I_{in}(t-1)$ is warped into registration with the current frame, $I_{in}(t)$ to provide the displacement information. Alternatively a reference from the same or another source can be used to provide the displacement information to warp the current frame into registration. Typically the initial estimate of displacement d(t; 0) used at time t is taken to be equal to the final estimate d(t−1; K) at time t−1. If acceleration from frame to frame is small it may only be necessary to perform one iteration of the estimation process per frame time, K=1, to achieve successive refinement.

While the proposed stabilization method makes use of two distinct warp steps, in practice these can often be performed by the same warp hardware device by multiplexing the warper inputs and outputs. For example, the output from frame store 36 and loop 104 are inputs and warper output to the estimator 106 is an output. Alternative inputs are the present image and the transformation parameters and the warper output is then the output image.

Figure 7:
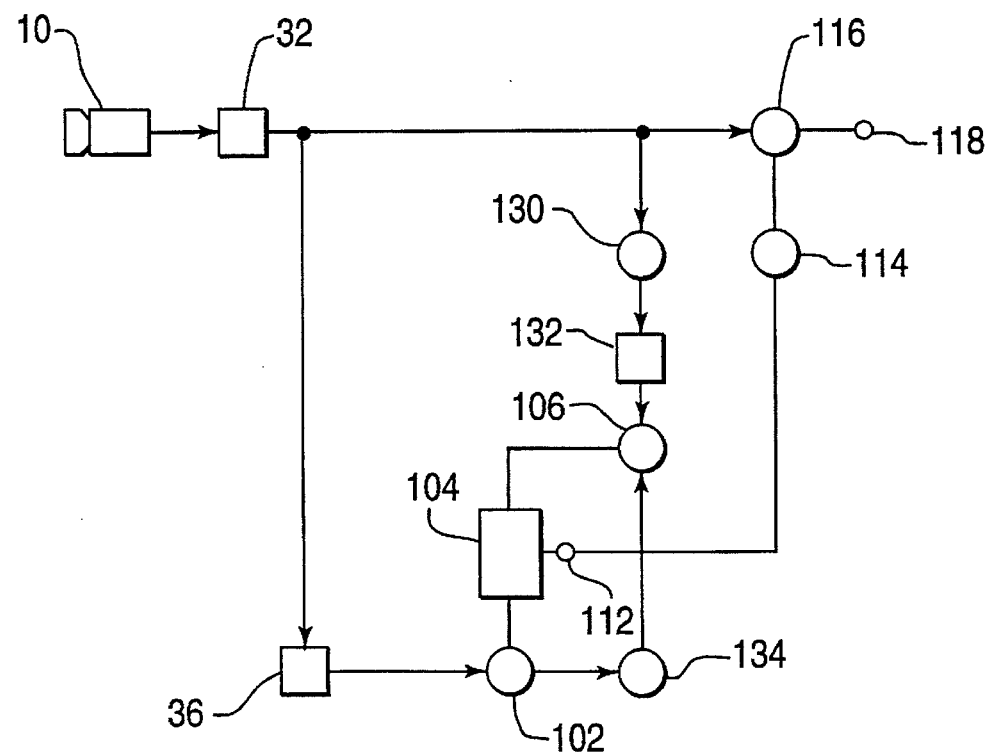
FIG. 7 is a schematic diagram of another electronic stabilization system of the invention.

The images $I_{in}(t)$ and $I_{warp}(t-1; k-1)$ may be filtered or otherwise processed prior to displacement estimation as shown in FIG. 7. In a preferred implementation, a Laplacian pyramid is constructed for the current input image, $I_{in}(t)$ in pyramid processor 130 and stored in memory 32. The Laplacian pyramid for $I_{warp}(t-1; k-1)$ is regenerated after the warp step on each iteration, k in the pyramid processor 134. Then successive refinement steps of the estimation process may base the estimate of residual displacement on progressively higher resolution pyramid levels.

Figure 8:
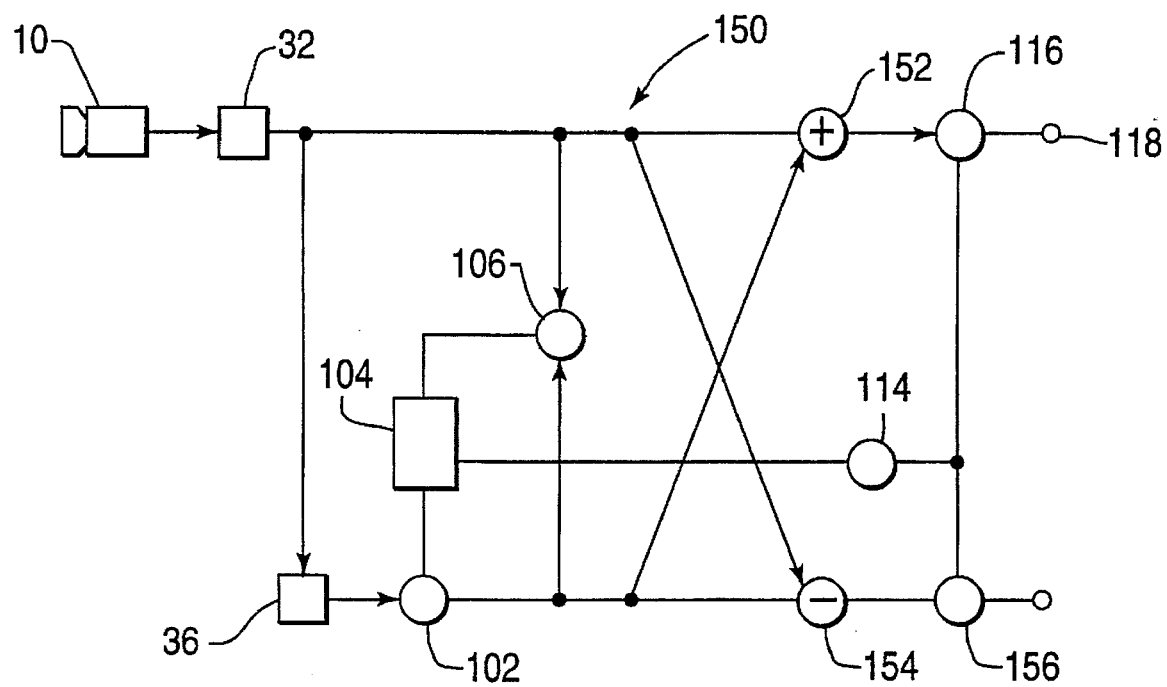
FIG. 8 is a schematic diagram of a system for motion adaptive frame-to-frame processing.

In FIG. 8 a system 150 for motion adaptive frame-to-frame processing as part of an image stabilization system of the invention includes means 152 for summing the present image $I_{in}(t)$ and the warped image $I_{warp}(t-1; k-1)$ pixel by pixel (temporal lowpass), to obtain a composite $$A(t)=I_{in}(t)+I_{warp}(t-1; k-1)$$

with reduced image noise. The system 150 also includes means 154 for subtracting (temporal high-pass) the present and the warped images pixel by pixel to form a difference image $$B(t)=I_{in}(t)-I_{warp}(t-1; k-1)$$

that reveals change or motion in the scene (moving target detection).

The sum and difference images may be provided directly as outputs of the stabilization system in addition to, or in place of, the stabilized output $I_{out}(t)$. The derived image sequences may be stabilized by warping in the same way that an image is stabilized with reference to FIG. 6.

More than two images may be aligned either for noise reduction (temporal low pass filter) or change detection (temporal high pass). As options, noise reduced images may be further enhanced, e.g., through sharpening or noise coring, or the change image can be further processed, e.g., to form a change energy image (or pyramid). It should be noted that methods for image alignment and temporal filtering are known. The invention is thus also the incorporation of frame-to-frame processing of images that are aligned as a step in image stabilization. In particular the generation of noise reduced or change enhanced image sequences through temporal low- and high-pass filtering, respectively, of the aligned input images and the stabilization of these derived sequences prior to output from the system.

Figure 9:
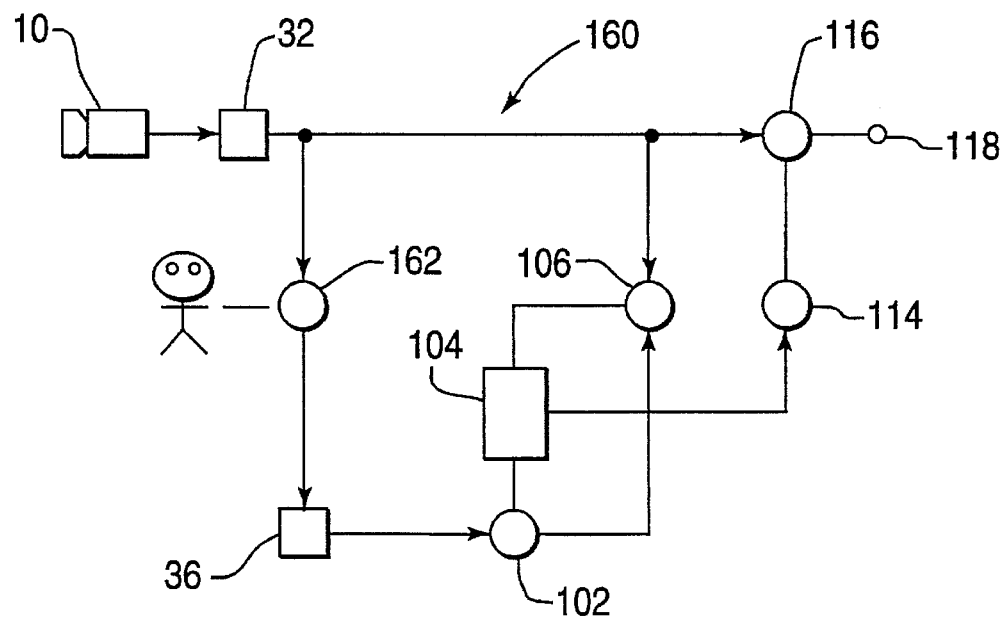
FIG. 9 is a schematic diagram of another stabilization system using a separate reference pattern, R.

In FIG. 9 a system 160 for aligning each image of the source sequence with a separate reference pattern R rather than with the preceding image. The reference pattern may be obtained from various sources. Typically, the reference pattern R is selected by selector 162 under user control from an earlier frame of the source video or it may simply be a previous image or piece of a previous image in the source video (e.g., every $n^{th}$ frame may be selected and used as the reference to align the following n-1 frames), or it may be a selected from a set of stored target patterns. The pattern R, stored in frame store 36, is warped in warper 102, producing an output $R_{warp}(k-1)$ in response to an estimate of the displacement of the pattern R between the reference and the present image Iin(t). The output of the system is the present image $I_{in}(t)$ warped to hold the region matched by the reference pattern stationary, or to cause that region to move along an arbitrary desired path. Alternatively, rather than search for a single target pattern, the system may search for a set of component patterns, e.g., using hierarchical structured search.

Figure 10:
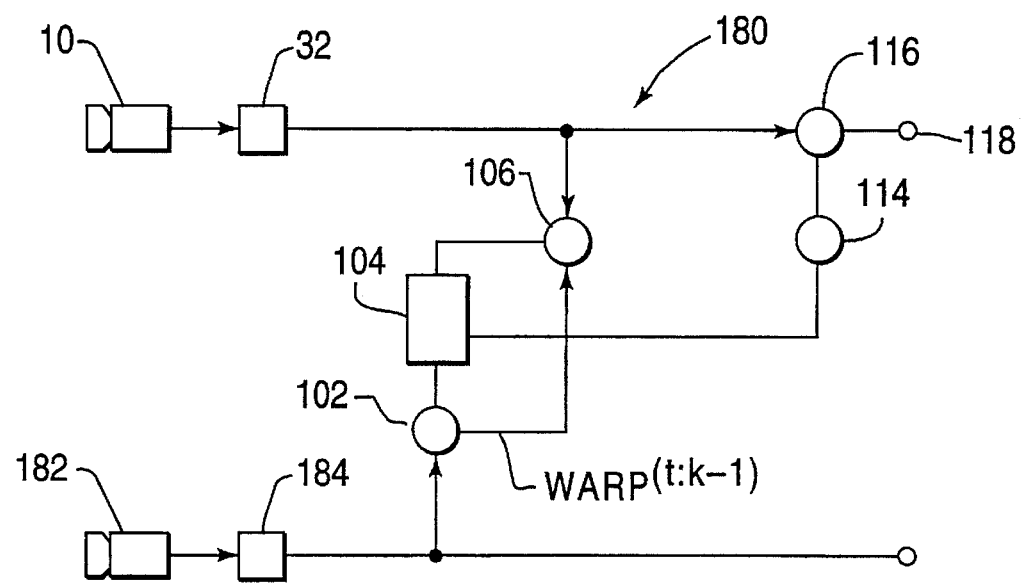
FIG. 10 is a schematic diagram of another stabilization system using two image sequences.

In FIG. 10 a system 180 for stabilizing images from different sources, e.g., IR and visible imagers, by registration of a particular image $I_{1n}(t)$ generated in imager 10 and stored in frame store 32 to a second image sequence $I_{2n}(t)$ from an image source 182 requires special displacement estimation procedures. The second image sequence $I_{2n}(t)$ is stored in frame store 184. The images in one source are aligned with the images from the other source; i.e., images from one source serve as the reference patterns used to stabilize the images from the other source. Warped image $I_{warp}(t; k-1)$ is compared with image $I_{1n}(t)$ in means 106 for estimating differences to determine the present difference d(t; k) which is then added to the previous estimate d(t; k-1) to provide the new estimate to warper 102. The final estimate of the differences is used by means 114 for generating transform parameters to provide the necessary information to warper 116 for stabilizing $I_{in}(t)$ to produce image $I_{out}(t)$ at terminal 118. Image $I_{2n}(t)$ is also available as a system output at terminal 186.

Various processes can be used to detect the location of target objects within the imager's field of view. These include correlation match (e.g., registration to a reference pattern), the detection of a region of activity in the motion flow field, and the detection of a region of activity in the temporal change image. Prior art systems use electronic target detection to steer the imager. These rely on correlation pattern match or frame to frame change but do not make use of image motion flow or of frame to frame change after electronic alignment. As a result, such systems can only use frame to frame change to detect a moving target if the imager is tracking the background and the background image is essentially stationary.

In the method of the invention, the background is electronically aligned, then the target is detected, then the location of the target directs the imager and/or electronic stabilization process to track and stabilize the target, not the background, in the output image sequence. The invention uses derived change or motion information to detect targets moving relative to the background, and to estimate both target motion and background motion and electronically detected target location and background motion information to control both imager steering and output image sequence stabilization.

Figure 11:
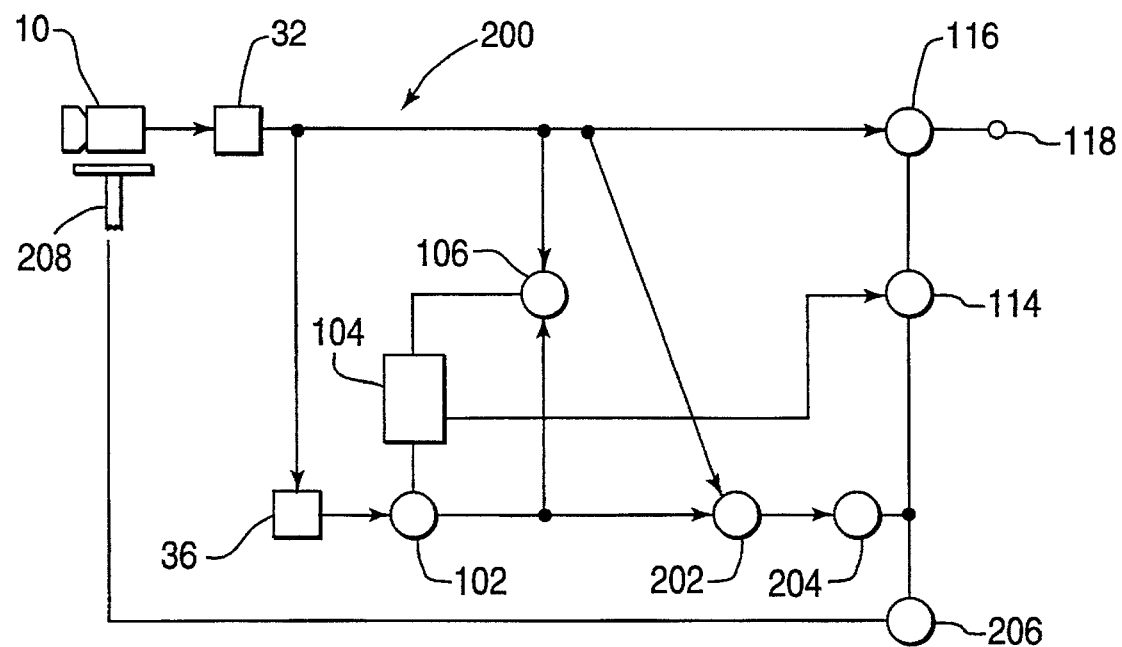
FIG. 11 is a schematic diagram of a system for locating a target.

In FIG. 11 a system 200 icludes high pass filter means 202 which takes the difference $I_{in}(t)-I_{warp}(t-1)$ and means 204 for determining the location of a target; i.e. any rapidly changing object in the images. The output of means 204 provides positional information which is fed to the means 106 and to a second means 206 for generating transform parameters. The output of means 206 is used to control imager platform 208 to steer the imager, e.g., in order to track or center the target, or to electronically stabilize or center the target. The input to means 106 provides offset motion to the image which can be used, for example, to center a rapidly moving object in the output image. More generally, the target location information can be used to both steer the imager and electronically compensate for residual motion. In this case warp parameters are based both on flame-to-frame displacement d(t; K) and on target location parameters x(t). The combination of filter means 202 and locator means 204 can also accept filtered differences from other pairs of images which are spatially and temporally aligned to improve target detection and reduce noise.

Figure 12:
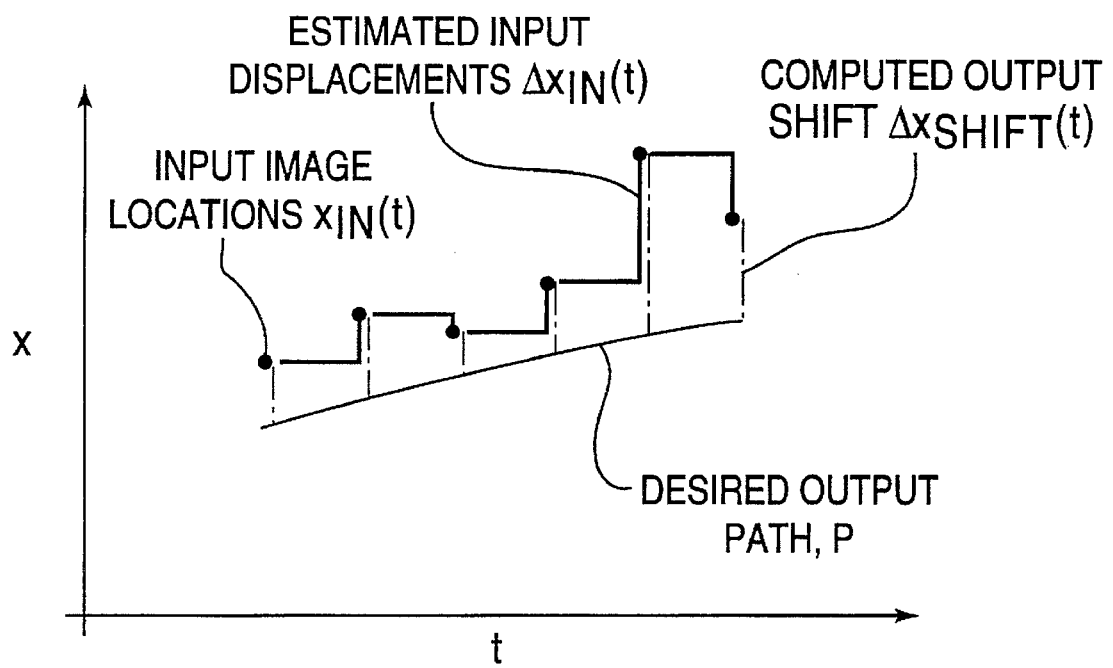
FIGS. 12 and 13 illustrate methods of obtaining the transformation parameters.

The function of an image stabilization system is to determine motion of the input sequence and replace observed motion with a desired motion in the output sequence. There are various transformations that can be used in means 114 to convert observed displacements d(t) to required warp parameters p(t). Here we describe three such methods. In FIG. 12, let $x_{in}(t)$ be the location of the $t^{th}$ input frame. In general this is a vector quantity including x, y, $\Theta$, scale (or higher order parameters in the case of model based stabilization, described below). Let $\Delta x_{in}(t)=d(t; K)$ be the observed frame-to-frame displacement. Let $x_{desired}(t)$ be the location of the $t^{th}$ image on some desired output path, P. The means 114 determines the displacement $\Delta x_{shift}(t)$ required to shift images from observed input locations to desired output locations. The transform module also determines the desired path P based on observed input displacements. The following are methods for obtaining P ($x_{desired}$) from the observed $\Delta x_{in}$.

In a "low-pass" method for transforming displacement estimates, the output sequence of positions is obtained by simply smoothing the input sequence of positions:

$$\Delta x_{shift}(t) = \Delta x_{in}(t) - w * \Delta x_{in}(t).$$

Here w is typically an IIR low pass filter. Different filters may be applied to obtain different parameters of motion. For example rotation $\Theta$ may be heavily smoothed, while translation (x, y) is moderately smoothed, and scale is not smoothed at all. In practice non-linear low pass filters may be used. For example there may be a limit placed on how large the displacement $x_{shift}(t)$ is allowed to get. The invention is also the motion damping by applying a low pass filter to the sequence of input positions to determine the desired output positions.

Figure 13:
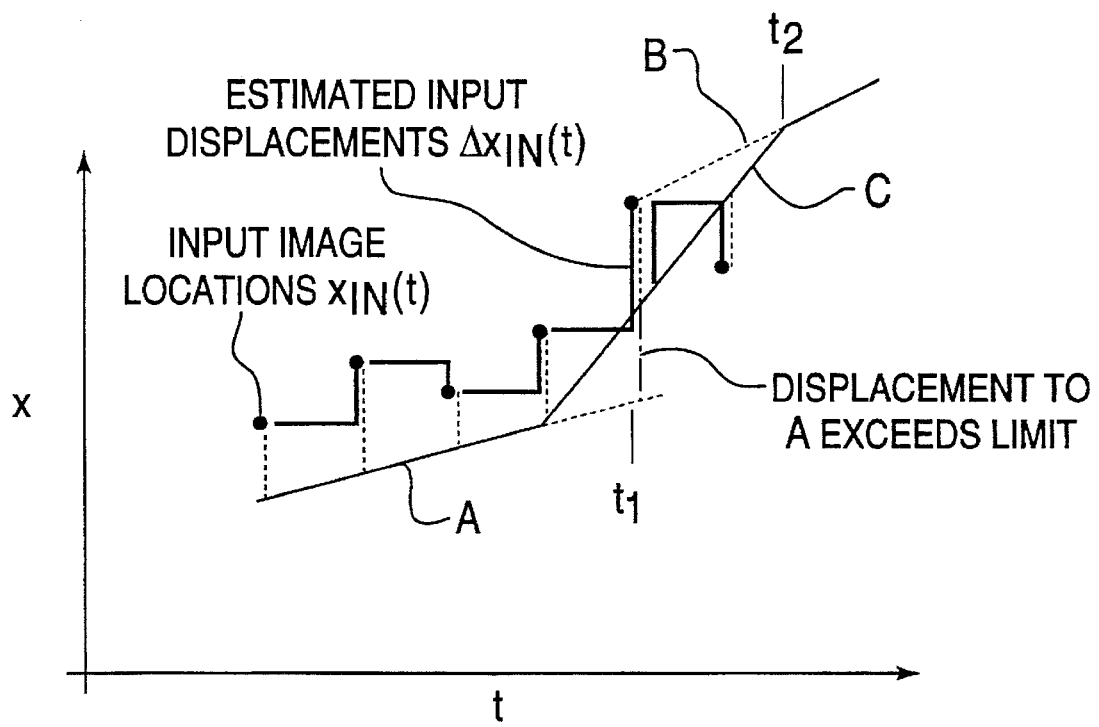

In a piece-wise continuous method fopr transforming displacement estimates as shown in FIG. 13, the output path is defined as a sequence of jointed linear (or other smooth) segments. These segments are selected to follow the expected trend in input image positions. All output frames may be shifted to a line segment A until time $t_1$ is reached at which this shift exceeds a predefined limit. Then a new segment is initiated that will tend to bring the output images back into the center of the output display. An estimate of velocity at $t_1$ is based, for example, on an average of the observed input displacement for a period of time preceding $t_1$. Alternatively, the desired path may be specified externally. This velocity and the position of frame $I_{in}(t_1)$ define a path B that predicts positions of subsequent input frames. The output path P is then made to follow a transition segment C that is constructed from the end of segment A, at time $t_1-1$, to segment B at $t_2$. Then P follows B until such time as the required shift again exceeds the predefined limit. This method removes high temporal frequency motions of the input sequence while allowing the output to follow trends in the input motion that may change abruptly in direction.

When a target tracking process is used in combination with a image alignment process as shown in FIG. 11, the detected target position can be used to determine output path P while the image alignment process is used to shift images to that path. The two-process approach may be needed when targets are small or move somewhat erratically in the scene. Piece wise smooth image stabilization ensures that unwanted high frequency motion of the background scene is removed in the output. Target tracking is used to define a path that keeps the target generally centered within the output display.

The target pattern may be a piece of the background scene designated by the operator, or a moving object in the scene designated by the observer or detected by the motion detection module. In the case of a pattern designated by the observer the system stores a pattern to be used as a reference in subsequent tracking. This reference may be automatically updated at regular intervals, e.g., every $n^{th}$ frame. Once the location that provides a best match to the reference pattern is found in the scene, the pattern at that location is stored as a replacement for the reference. In this way the system can adapt to gradual changes in the target pattern. If the detected location of the target pattern were used directly to stabilize the output sequence there would tend to be a slight jump (discontinuity in output path, P) each time the reference pattern is updated. This jump is avoided by using observed target pattern position to define segments in the path, P, while the background precise alignment process defines shifts x(t) and p(t) in FIG. 11. The invention is also the use of separate background and target tracking processes in stabilization. The background process provides piece wise smooth stabilization while the target tracking process determines segments of the output motion path in order to move the target pattern smoothly to a desired position in the output display.

Existing mechanical stabilization devices stabilize two or three axes of imager rotation. Existing electronic devices compensate for image translation in the imager field of view. An important advantage of the electronic approach proposed here is that it can be used to compensate for components of motion that cannot be compensated through imager control. For example, electronic warp can compensate for lens distortions as patterns move over the imager field of view. More importantly, electronic stabilization can be use to compensate for parallax motion as the imager moves relative to a surface in the scene. Stabilization is based on a mathematical model of that motion and parameters estimated through the precise alignment method outlined above. For example a quadratic warp can compensate for motion of a planar surface that may be tilted relative to the imager direction of gaze.

Electronic stabilization may be used to compensate for the motion of surfaces that exist in the scene (e.g., a road surface in front of an autonomous vehicle) or of surfaces that are define relative to the imager (e.g., a vertical surface at a predefined distance from a moving vehicle). The former method provides a means for estimating the motions and distances to surfaces in the scene as well as stabilizing those surfaces, while the latter method provides a means for detecting objects as they cross an "invisible barrier" at a prescribed distance from the imager. (Detection can be based on residual motion model based stabilization of a surface in front of a moving vehicle followed by temporal low pass filter results in motion blur for all objects in the scene that are not near that surface. Objects will appear sharp as they pass through the "invisible barrier".)

Model based stabilization can be used to stabilize a surface in the scene, such as that of the road itself. In this case the motion of the surface relative to the imager must be determined. This can be done using known model based displacement estimation procedures. These techniques have been proposed in the past as a means for determining surface shape and distance. Here we propose the use of these techniques in the stabilization of image sequence.

Imaging means 10 may be comprised of a structure for receiving radiation reflected from objects within a field-of-view which are illuminated by an external radiator. Alternatively, imager means 10 may be comprised of a structure that includes means for illuminating objects within its field-of-view with radiation and means for receiving reflected echoes from such objects (these echoes also may provide object-distance information). Further, imaging means 10 may be responsive to radiation of any given wavelength portion of electromagnetic, ultrasonic and/or any other type of wave-energy spectrum. An analog-to-digital (A/D) converter converts the image data in each successive frame to digital form for processing by a digital processor The image warpets 102 and 116 are preferably formed from a TMC 2302 Image Manipulation Sequencer and a TMC 2246 Image Filter manufactured by TRW, Inc. The Image Manipulation Sequencer is used to generate an address in the source image given an address in the output image. The Image Filter interpolates the output pixel value given input pixels in the neighborhood of the specified input image address. The input image is stored in standard memory that has been segmented to allow simultaneous read of all the neighboring pixels needed by the interpolator.

The transform unit converts observed image displacements and externally spacified control information. The transform module may be a general purpose computing device, such as the TMS 320 C 30 digital signal processing chip manufactured by Texas Instruments, Inc., Dallas, Texas, with some memory. The transform module may include several different stabilization control modes, each specified by computer code stored in its memory. For example, these may include damped motion stabilization, piece-wise linear stabilization, and stabilization combined with target centering. The mode used at any moment in time is normally specified by an external input to the system. Other inputs to the transform module include frame to frame displacements, computed by the displacement estimator, and target locations, computed by the locator module. Each frame time the transform module first determines the desired output motion path, then the required displacement to move an input frame to that path. The displacement parameters are provided to the warper as the output of the system. Inputs include frame to frame displacments information from the displacement estimator and external mode or other control specification.

Image analysis by decomposition of an image where a comparatively high-resolution image having a first number of pixels is processed to derive a wide field-of-view, low resolution image having second number of pixels smaller than the first number has been disclosed by Burt in Multi-resolution Image Processing And Analysis, volume 16, pages 20–51, 1981 and Anderson et al in U.S. Pat. No. 4,692,806, incorporated herein by reference for its teachings on image decomposition techniques.

Figure 14:
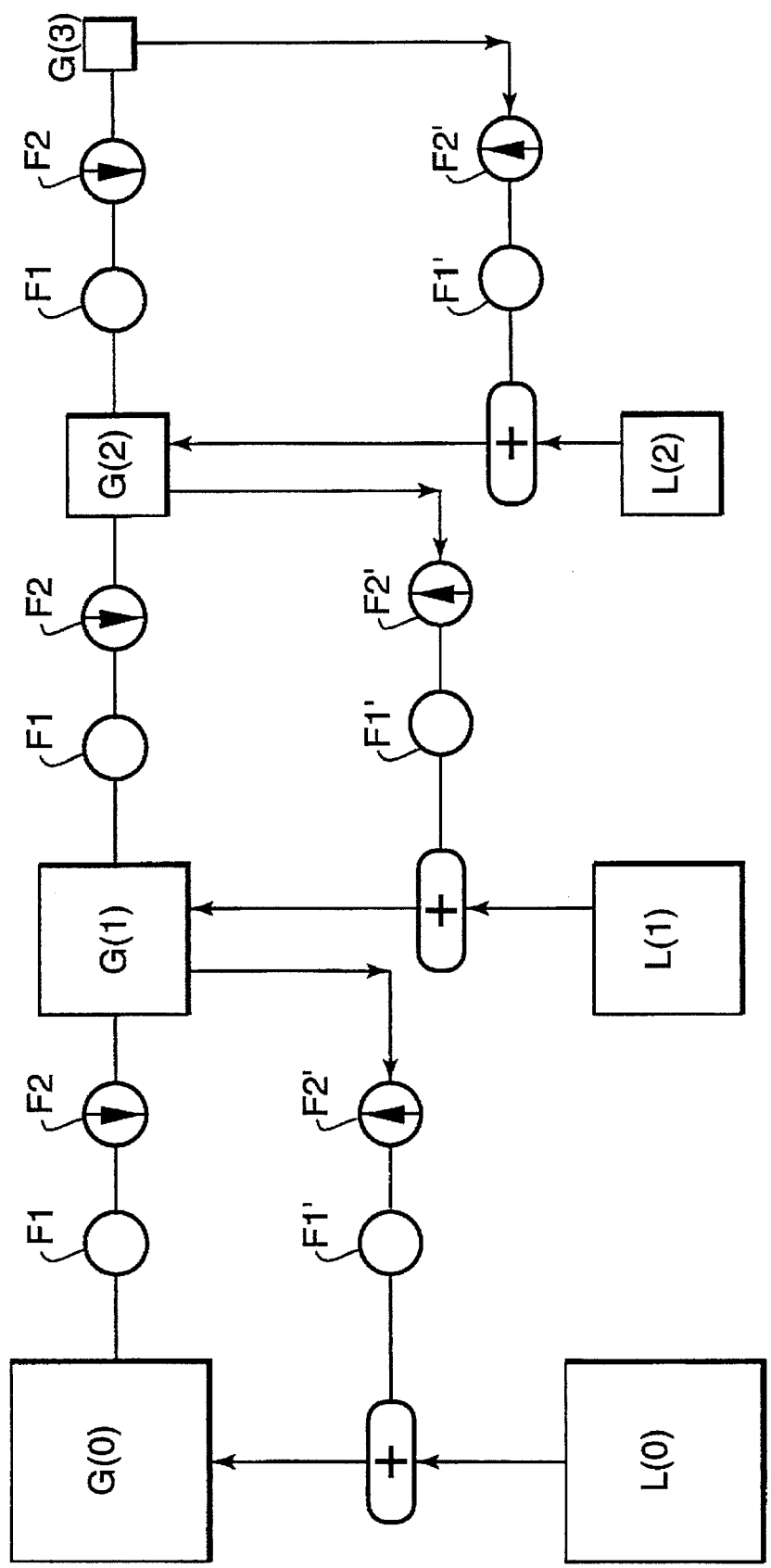
FIG. 14 illustrates a method for forming the Gaussian and Laplacian pyramids.

The Laplacian transform is used to decompose each source image into regular arrays of Gaussian-like basis functions of many sizes, sometimes referred to as basis functions of the pyramid transform or as wavelets. A multiresolution pyramid for an image permits coarse features to be analyzed at low resolution and fine features to be analyzed at high resolution. Each sample value of a pyramid represents the amplitude associated with a corresponding basis function. In FIG. 14, a flow chart for the generation of the Gaussian and Laplacian pyramids of a source image is shown. The Gaussian G(0) is the source image which is then filtered by F1, a low pass filter having a Gaussian rolloff, and subsampled by F2, to remove alternate pixels in each row and alternate rows, to form the first level Gaussian G(1). The lower level Gaussians G(n) are formed successively in the same way. The Laplacian L(n) corresponding to the Gaussian at each level of the pyramid is formed by restoring the subsampled data to the next lowest level of the Gaussian pyramid (by inserting zero-valued samples between the given samples F2' then applying an interpolation filter F1) and subtracting from the Gaussian of the given level. The Laplacian formed in this way is known as the Reduce-Expand (RE) Laplacian. Alternatively, the Laplacian can be formed without subsampling and reinterpolation as shown by the dotted line. This is called a filter-subtract-decimate (FSD) Laplacian.

The process for decomposing the image to produce lower resolution images is typically performed using a plurality of low-pass filters of differing bandwidth having a Gaussian roll-off and can be efficiently implemented using the PYR-1 circuit described in U.S. patent application No. 07/805149, incorporated herein by reference, and in the Workshop For Machine Vision, Paris, December, 1991 and generally in U.S. Pat. No. 4,703,514, and sold by the Sensar, Inc., PO Box , Princeton, N.J. 08540. The PYR-1 pyramid circuit accepts up to three digitized input signals and provides up to two output signals. The input and output data channels incorporate timing signals which control the pipelined processing. These timing signals are automatically adjusted to the processing delay of the circuit, allowing for automatic delay control in pipelined systems. The effective lengths of the horizontal delay lines used to implement a two-dimensional filter are controlled by the timing signals and, thus, do not need to be programmed. This circuit accepts and processes signals having continuously variable horizontal and vertical blanking times. For an image from a video camera, the horizontal and vertical sync signals provide the timing signals. These signals are digitized and then combined with the digital data signal to produce the input signal. Alternatively the digital data signal may be generated by a frame store in which case the timing signal is added by the frame store or an auxiliary device. The circuit has two parallel paths which may be used to simultaneously calculate a Gaussian low-pass filtered image and a Laplacian function (the difference of the input image and the Gaussian) of the input image. The two parallel paths are also used for computing the inverse pyramid transforms.

Figure 15:
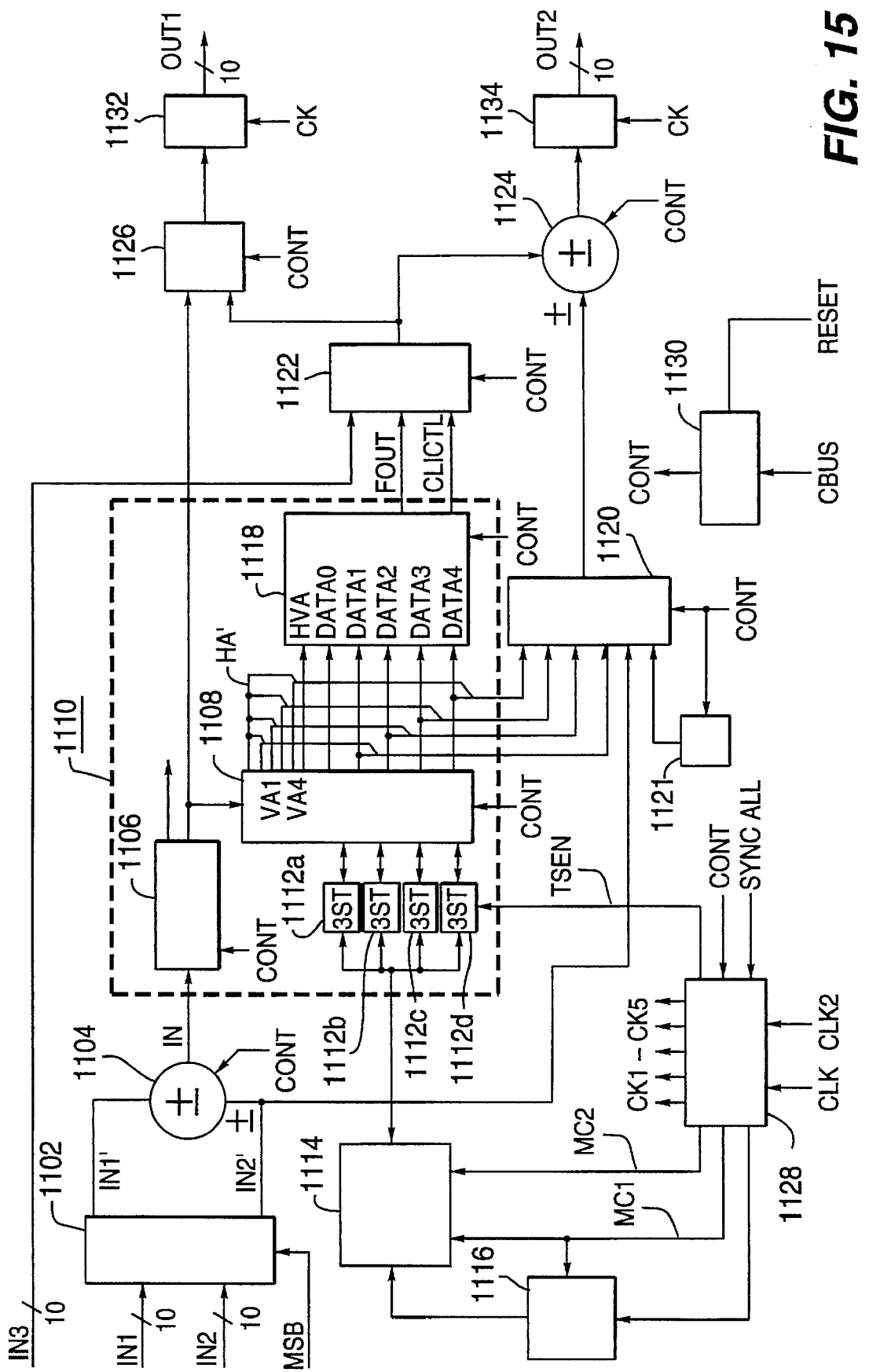
FIG. 15 is a schematic diagram of a PYR-1 circuit.

In FIG. 15 an exemplary PYR-1 circuit can accept up to three input signals, IN1, IN2 and IN3, and provide up to two output signals, OUT1 and OUT2. Each of these signals is a multibit digital signal containing at least eight data bits and two timing bits. The two timing bits convey respective timing signals. One signal, HA, is in a logic high state when the data in a line is valid (i.e. during the active picture interval) and in a logic low state otherwise (i.e. during the horizontal blanking interval). The other signal, VA, is in a logic high state when the data in a field is valid and in a logic low state otherwise (i.e. during the vertical blanking interval).

Figure 1:
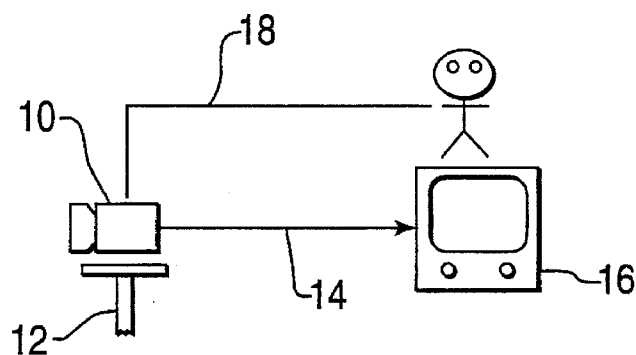
FIG. 1 is a schematic diagram of a prior art mechanically stabilized platform.
Figure 2:
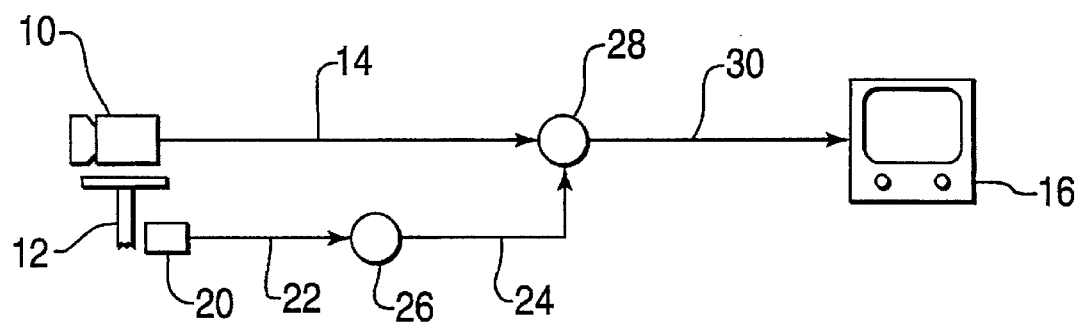
FIG. 2 is a schematic diagram of a prior art electronic stabilization system with imager motion sensors.
Figure 3:
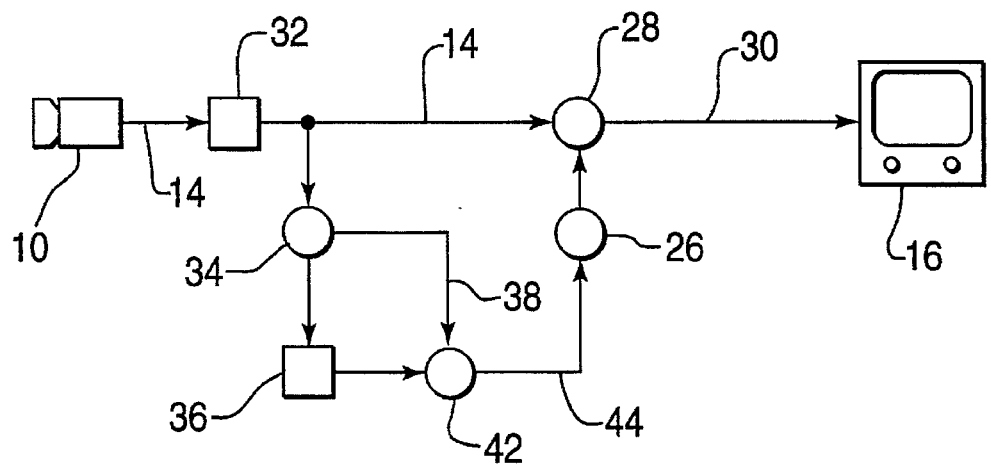
FIG. 3 is a schematic diagram of a prior art electronic stabilization system with digital processing.
Figure 4:
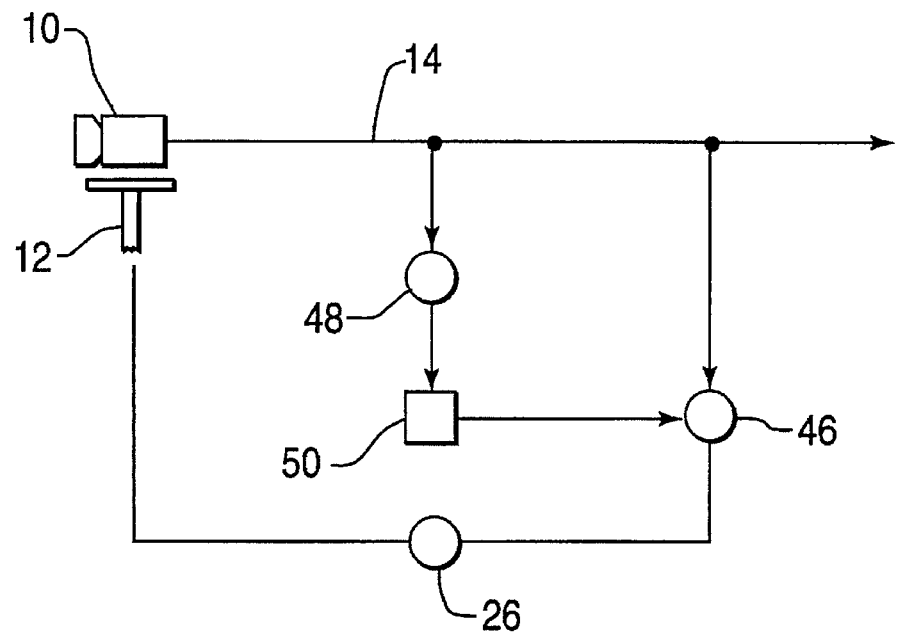
FIG. 4 is a schematic diagram of a prior art system for electronic target tracking.
Figure 5:
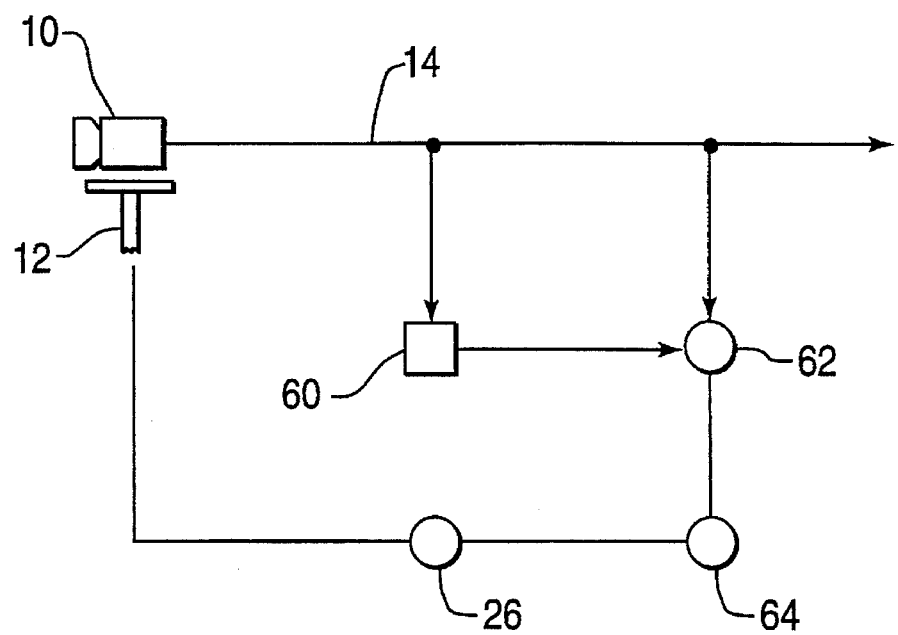
FIG. 5 is a schematic diagram of a prior art system for electronic target tracking via change detection.

The circuit includes five principal elements: an input arithmetic and logic unit (ALU) 1104, a filter 1110 (shown within the dashed line in FIG. 1), a multiplexer 1120, a clip processor 1122 and an output ALU 1124. Signals IN1 and IN2, equally delayed by an input delay element 102 are combined by the ALU 1104 to generate a signal, IN, for application to the filter 1110. This signal may be one of the signals IN1 or IN2, or it may be their sum (IN1+IN2) or their difference (IN1−IN2).

The filter 1110 processes the signal provided by the ALU 1104 through a two dimensional filter which may be configured to have between one and five taps in each of its two dimensions. The filter includes a vertical edge processor 1106 and a horizontal edge processor 1108 which allow a variety of different types of pixel values to be implied as surrounding the actual image data. Among these are a constant value or a repeat of the first or last horizontal or vertical line. The processor 108 processes the input signals to effectively add lines of border pixels to the image at the top and bottom edges. In addition, it acts in concert with three-state gates 1112a–1112d and a memory 1114 to implement a tapped delay line which is used to provide four line-delayed image signals to the vertical filter portion of the convolution processor 1118.

A memory 1114 provides a four or eight-line delay for the vertical portion of the two-dimensional filter. The delayed lines are combined both vertically and horizontally in the convolution processor 1118 to complete the filter 1110. The output signal provided by the filter 1110 is processed by clip processor 1122 which performs rounding and scaling for single precision signals and combines the filtered data as the more significant bit (MSB) positions with filtered data representing the less significant bit (LSB) portions, provided via input IN3, to generate double-precision output signals.

The output signal of the processor 1122 or the output signal of the ALU 1104, as processed by the processor 1106, may be selected as the output signal OUT1. The output signal OUT2 may be the output signal of the clip processor 1122 or the output signal of the multiplexer 120 or the output of the ALU 1124 combining these two signals. The signal provided by the multiplexer 1120 may be either a constant value, K2, the input signal IN2 or one of the delayed horizontal line signals provided by the horizontal edge processor 1108. The multiplexer 1120 includes internal compensating delays (not shown) which align each of the input signals to the signal provided by the clip processor 1122. Timing signals for the circuit are generated by timing circuitry 1128 which produces a two-phase memory clock and a system clock signal CK from a two phase input clock signal, CLK and CLK2.

The circuit functions are controlled via control circuitry 1130 which accepts user commands from a control input channel CBUS and provides control signals and data values to the other components of the circuit via an output port CONT.

Although the invention is illustrated and described herein embodied as an imaging system, the invention is nevertheless not intended to be limited to the details as shown. For example, the invention includes sequences of images from a single source or images from multiple sources. Rather, various modifications may be made in the details within the scope and range of equivalents of the claims and without departing from the spirit of the invention.

Figure 16:
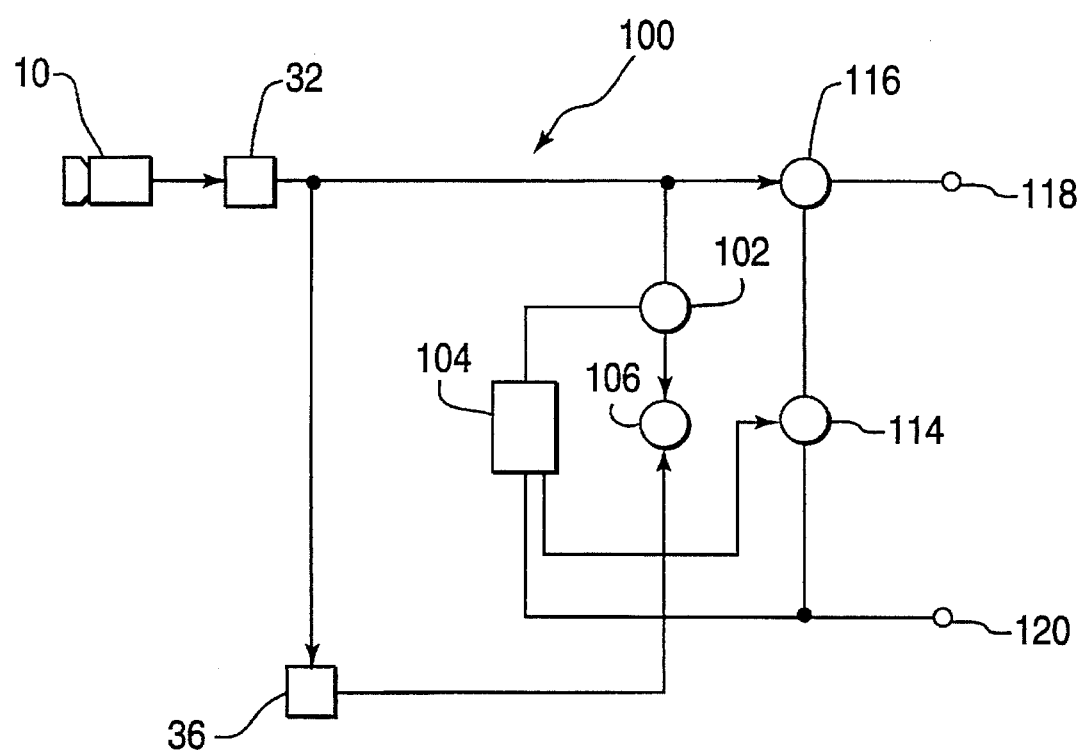
FIG. 16 is a schematic diagram of an alternative embodiment of the FIG. 6 electronic stabilization system.

It is also clear that, while the invention was described in terms of warping a reference to determine the estimate of the displacement in an image, the image itself could be warped for comparison with the reference in the estimator. The final estimate of the displacement is then used to warp the image to form the stabilized output image. In FIG. 16 the system is the same as that of FIG. 6 except that the position of the warper is changed so that the present image rather than the reference is warped to obtain the estimate of the displacement.

We claim:

1. In an electronic image stabilization method responsive to a sequence of successive pairs of image frames in digital form, wherein said method includes the steps of (a) employing an iteratively-operated feedback loop comprising a first image warper, a displacement estimator, an adder and a memory to reduce a most erroneous initial estimate of displacement between images depicted by each pair of image frames of said sequence to a least erroneous final estimate of displacement, and (b) storing said final estimate of displacement in said memory; the improvement comprising the further steps of:

(c) converting said final estimate of displacement stored in said memory into output transformation parameters in accordance with a given image-change model that includes at least one of zoom, parallax translation, rotation, dilation. and lens distortion; and (d) employing a second image warper to warp a certain image frame of each of said successive pairs of image frames in accordance with said output transformation parameters.

2. The electronic image stabilization method defined in claim 1, wherein:

said certain image frame of each of said successive pairs of image frames corresponds to the then-current image frame of that pair of image frames in said sequence; and the image frame other than said certain image frame of each of said successive pairs of image frames corresponds to the image frame that immediately precedes the then-current image frame of that pair of image frames in said sequence.

3. The electronic image stabilization method defined in claim 1, wherein:

said certain image frame of each of said successive pairs of image frames corresponds to the image frame that immediately precedes the then-current image frame of that pair of image frames in said sequence; and the image frame other than said certain image frame of each of said successive pairs of image frames corresponds to the then-current image frame of that pair of image frames in said sequence.

4. The electronic image stabilization method defined in claim 1, wherein each of said successive pairs of image frames in said sequence is available at a plurality of resolutions that extend from a given lowest resolution to a given highest resolution; and wherein step (a) comprises the step of:

(e) starting with said given lowest resolution image frames, employing said iteratively-operated feedback loop, in turn, on each successively higher resolution image frames to reduce a most erroneous initial estimate of displacement between images depicted by each given lowest resolution pair of image frames to a least erroneous final estimate of displacement depicted by each given highest resolution pair of image frames.

5. The electronic image stabilization method defined in claim 1, wherein step (a) comprises the step of:

(e) employing the final estimate of displacement between images depicted by a pair of image frames which precedes a current pair of image frames in said sequence as the initial estimate of displacement of said current pair of image frames.

6. The electronic image stabilization method defined in claim 1, wherein step (c) comprises the step of:

(e) converting said final estimate of displacement stored in said memory into output transformation parameters in accordance with a given image-change model that derives output transformation parameters which form a piece wise linear path.

7. The electronic image stabilization method defined in claim 1, wherein step (c) comprises the step of:

(e) converting said final estimate of displacement stored in said memory into output transformation parameters in accordance with a given image-change model in which low pass filtering is applied to smooth image differences.

8. In an electronic image stabilization apparatus responsive to a sequence of successive pairs of image frames in digital form; wherein said apparatus includes (a) an iteratively-operated feedback loop comprising a first image warper, a displacement estimator, an adder and a memory for reducing a most erroneous initial estimate of displacement between images depicted by each pair of image frames of said sequence to a least erroneous final estimate of displacement, and (b) means for storing said final estimate of displacement in said memory; the improvement comprising:

means for converting said final estimate of displacement stored in said memory into output transformation parameters in accordance with a given image-change model that includes at least one of zoom, parallax translation, rotation, dilation and lens distortion; and means for employing a second image warper to warp a certain image frame of each of said successive pairs of image frames in accordance with said output transformation parameters.

9. The electronic image stabilization apparatus defined in claim 8, further comprising:

a first image frame store for storing said certain image frame of each of said successive pairs of image frames; and a second image frame store for storing the image frame other than said certain image frame of each of said successive pairs of image frames.

10. The electronic image stabilization apparatus defined in claim 9, wherein:

said certain image frame of each of said successive pairs of image frames stored in said first image frame store corresponds to the then-current image frame of that pair of image frames in said sequence; and said image frame other than said certain image frame of each of said successive pairs of image frames stored in said first image frame store corresponds to the image frame that immediately precedes the then-current image frame of that pair of image frames in said sequence.

11. The electronic image stabilization apparatus defined in claim 9, wherein:

said certain image frame of each of said successive pairs of image frames stored in said first image frame store corresponds to the image frame that immediately precedes the then-current image frame of that pair of image frames in said sequence; and said image frame other than said certain image frame of each of said successive pairs of image frames stored in said first image frame store corresponds to the then-current image frame of that pair of image frames in said sequence.

12. The electronic image stabilization apparatus defined in claim 8, further comprising:

pyramid means for providing each of said successive pairs of image frames in said sequence at a plurality of resolutions that extend from a given lowest resolution to a given highest resolution; and wherein:

said iteratively-operated feedback loop includes means which start by operating on said given lowest resolution image frames and then, in turn, operate on each successively higher resolution image frames to reduce a most erroneous initial estimate of displacement between images depicted by each given lowest resolution pair of image frames to a least erroneous final estimate of displacement depicted by each given highest resolution pair of image frames.

13. The electronic image stabilization apparatus defined in claim 8, wherein said apparatus further comprises:

(e) means for providing said iteratively-operated feedback loop with the final estimate of displacement between images depicted by a pair of image frames which precedes a current pair of image frames in said sequence as the initial estimate of displacement of said current pair of image frames.

14. The electronic image stabilization apparatus defined in claim 9, wherein:

said means for converting said final estimate of displacement stored in said memory into output transformation parameters in accordance with a given image-change model includes means that derives output transformation parameters which form a piece wise linear path.

15. The electronic image stabilization apparatus defined in claim 8, wherein:

said means for converting said final estimate of displacement stored in said memory into output transformation parameters in accordance with a given image-change model includes low-pass filter means that derives output transformation parameters which are effective in smoothing image differences.

* * * * *